US007669306B2

(12) United States Patent
Palka

(10) Patent No.: US 7,669,306 B2

(45) Date of Patent: Mar. 2, 2010

(54) GEAR PULLER

(76) Inventor: Waldemar Palka, 342 Westwood Rd., Lancaster, NY (US) 14086

( * ) Notice: Subject to any disclaimer, the term of this patent is extended or adjusted under 35 U.S.C. 154(b) by 0 days.

(21) Appl. No.: 11/999,181

(22) Filed: Dec. 4, 2007

(65) Prior Publication Data

US 2009/0139071 A1 Jun. 4, 2009

(51) Int. Cl.
*B23P 19/04* (2006.01)

(52) U.S. Cl. ............................ 29/261; 29/259; 29/255; 29/265

(58) Field of Classification Search .................. 29/252, 29/259–266, 821, 255, 275, 278
See application file for complete search history.

(56) References Cited

U.S. PATENT DOCUMENTS

| | | | | | |
|---|---|---|---|---|---|
| 1,828,252 | A | * | 10/1931 | Lynch | 29/252 |
| 2,331,167 | A | | 10/1943 | Brecht et al. | |
| 2,648,374 | A | | 8/1953 | Qualen | |
| 3,029,501 | A | * | 4/1962 | Leathers | 29/213.1 |
| 3,224,086 | A | * | 12/1965 | Balamuth | 29/255 |
| 3,786,544 | A | | 1/1974 | Ferguson | |
| 5,579,567 | A | | 12/1996 | Acevedo | |
| 5,644,982 | A | | 7/1997 | Koura et al. | |
| 6,839,947 | B1 | | 1/2005 | Dudeck | |
| 6,886,227 | B1 | | 5/2005 | Hedrick | |
| 7,080,958 | B1 | | 7/2006 | Morris | |
| 2009/0139071 | A1 | * | 6/2009 | Palka | 29/259 |

FOREIGN PATENT DOCUMENTS

| | | |
|---|---|---|
| JP | 54033854 A | 3/1979 |
| JP | 06063872 A | 3/1994 |

OTHER PUBLICATIONS

SPX Power Team Catalog No. PT502, pp. 206-218, publication date unknown.

* cited by examiner

*Primary Examiner*—Lee D Wilson
(74) *Attorney, Agent, or Firm*—Simpson & Simpson, PLLC

(57) ABSTRACT

The invention disclosed includes a gear puller system in which a vibrating means is used to loosen the target gear in a machine making it easier to remove or pull the gear from a housing, such as a hub. In one embodiment, the vibrator transmits vibrations along the shaft of the gear puller. In second vibration, the vibrating means transmits vibrations through the machine to the gear puller.

13 Claims, 8 Drawing Sheets

GEAR PULLER

FIELD OF THE INVENTION

The present invention pertains to the field of gear and bearing removal, more particularly to gear pullers and more specifically to vibration enhanced gear pullers.

BACKGROUND OF THE INVENTION

The gears in machine gear systems are often linked or meshed together in very close tolerances that create a tight fit between individual gears. The tight tolerances help to minimize wear on gears by reducing the amount of free space between gear teeth. Free space allows gears to travel or rotate without resistance leading to a "hammer" effect when the gears finally do encounter resistance in the form of another gear.

While tight tolerances between gears reduce wear on the gears, it also makes it more difficult to remove gears for maintenance or replacement. Normally, the most frequent way of removing gears is to apply a simple pulling force to a gear puller attached to one or more gears or a gear set. The application of this force can lead to damage to the gears if not applied precisely and can also lead to injury to the persons carrying out the pulling operation.

Because the amount of force required to remove a gear or gear system can be considerable, it is sometimes necessary to add a secondary force to the puller. Often this secondary force is the application of vibration. U.S. Pat. No. 2,648,374 to Qualen discloses a machine that uses vibration to help remove tires from tire rims. An air hammer is raised and lowered by alternately applying and removing air pressure to a piston that is pushed up to strike against a head holding a tire and tire rim. The vibration caused by the piston helps to shake the tire off the tire rim. U.S. Pat. No. 3,224,086 to Balamuth discloses the use of a vibrator to aid in the insertion of one rod or gear into a bore in a larger rod or encasement.

U.S. Pat. No. 5,644,987 to Koura discloses a printing press with an apparatus for attaching and detaching bearings for the press cylinder. In one embodiment, a vibrator is used to beat against the bearing in the direction of extraction to help remove the bearing from the press. Similarly, U.S. Pat. No. 6,839,947 to Dudeck discloses a power hammer puller in which a cylindrical tube is attached to a multi-clawed gear puller. The hollow tube holds an air hammer that directs a forceful pulse of air against an opposite end plate. The vibration of the repeated pulses from the air hammer eventually results in pulling the bearing from its housing.

The devices disclosed in the above prior art are related in that the vibration are created by a piston, air hammer, or other device directed along an axis. As such, the efficiency of each of the devices increases in direct proportion to the space that is available to increase the length of the vibrational axis. However, none of the disclosed devices provide for situations in which a limited amount of space is available to generate a forceful axial vibration. In addition, none of the cited prior art discloses the use of vibrators that do not cause an axial vibration using a moving piston or other item.

Thus, there is a need in the field for a device and method for removing tightly fitting gears from there housings when only a limited amount of space is available.

SUMMARY OF THE INVENTION

The present invention broadly comprises a gear pulling system comprising a gear puller that includes a shaft having a first end and a second end, wherein the shaft is threaded for all or most of its length between the first end and the second end, a first tightening means positioned at the first end, a claw with the claw having a crosspiece, in which the crosspiece defines an orifice having an internal thread, the orifice being threadably engaged with the threaded shaft, and at least two claw legs pivotally attached to the crosspiece. The gear pulling system also includes a vibration means with the vibration means operatively attached to the shaft to generate vibrations through the shaft.

The present invention also broadly comprises a system for removing a gear from a machine that includes a gear puller having a shaft with a first end and a second end, in which the shaft is threaded for all of most of its length between the first end and the second end, a tightening means positioned at the first end, a claw with the claw having a crosspiece, in which the crosspiece defines an orifice having an internal thread, wherein the orifice is threadably engaged with the threaded shaft, and at least two claw legs pivotally attached to the crosspiece, and a vibration means in which the vibration means is in direct contact with the machine.

The present invention further broadly comprises a gear pulling system having a gear puller which includes a shaft, a claw having a crosspiece, at least two claw legs pivotally attached to the crosspiece and a fluid driven system integral with the crosspiece and operatively arranged to drive the shaft in an axial direction. The present invention further includes a vibration means operatively attached to the shaft to generate vibrations through the shaft.

One object of the invention is to provide a gear pulling system in which a vibration generator (vibrator) is used to aid in removing one or more gears from a system.

A second object of the invention is present a gear pulling system in which the vibrator is included within the gear pulling shaft.

A third object of the invention is to supply a gear pulling system in which the vibrator may be positioned at various locations relative to the claw.

An additional object of the invention is to supply a gear pulling system that may be used in confined spaces.

A further object of the invention is to provide a system that includes a vibrator detached from the gear puller.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which.

DETAILED DESCRIPTION OF THE INVENTION

At the outset, it should be appreciated that like drawing numbers on different drawing views identify identical structural elements of the invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Figure 1:
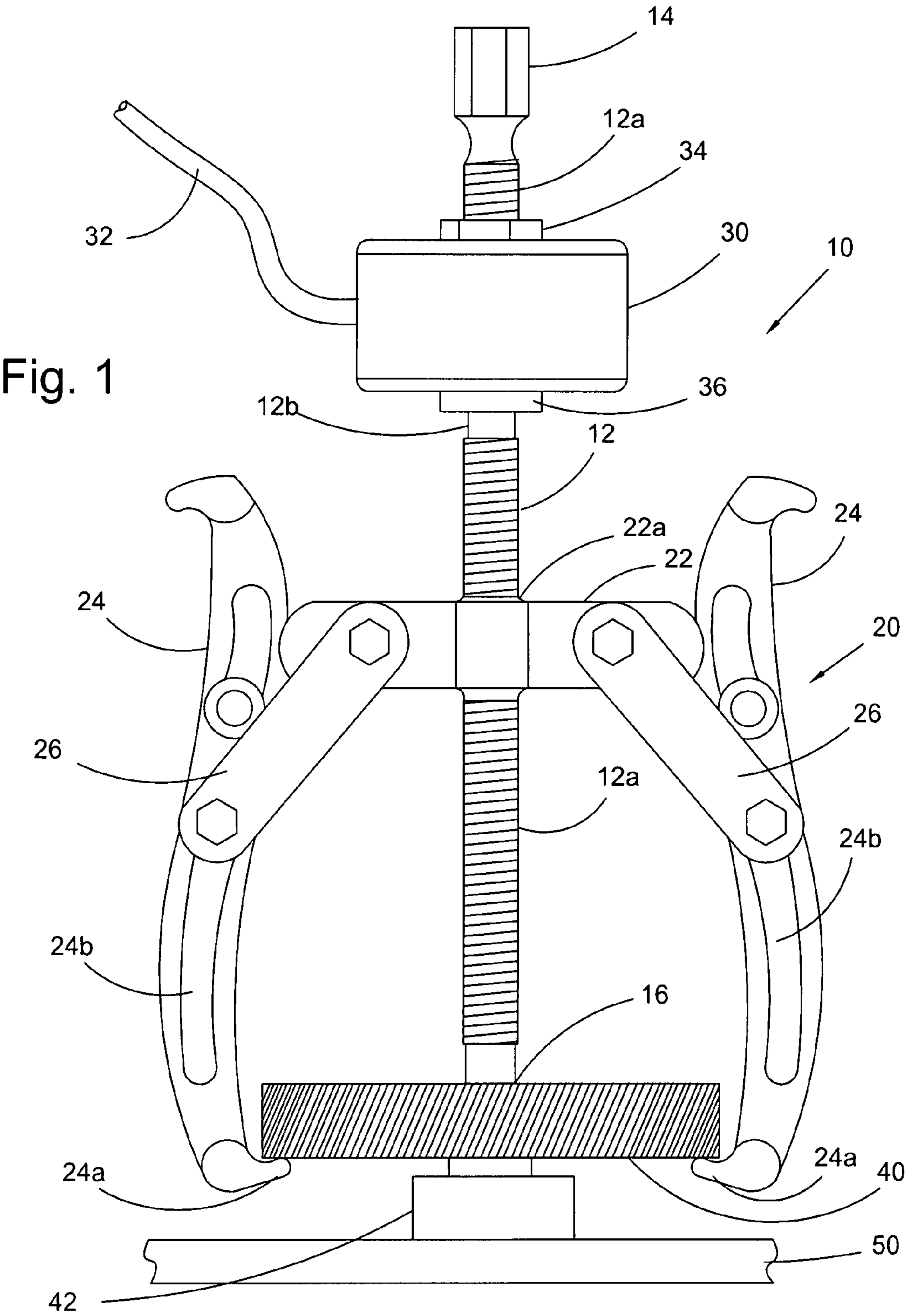
FIG. 1 is a side view of a gear puller system of the present invention.

Adverting to the drawings, FIG. 1 is a side view of gear puller system 10 ("system 10"). Shaft 12 includes threads 12*a* along all or most of its length. Tightening means 14 is positioned at one end of shaft 12. In this embodiment, tightening means 14 is a hexagonal nut shaped into one end of shaft 12. In other embodiments, tightening means 14 may be in the form of a welded nut, a turning rod or handle inserted through a hole at the end of shaft 12, or other embodiments well known to those skilled in the art.

Claw 20 includes crosspiece 22 threaded onto shaft 12. Crosspiece 22 defines orifice 22*a* which includes internal threads (not shown) that allow crosspiece 22 to be threadably attached to shaft 12. At least two claw legs 24 are pivotably attached to crosspiece 22. By pivotably attached is meant that claw legs 24 are attached to crosspiece 22 in such a manner that are able to be displaced away from shaft 12 and then reposition to fit claw points 24*a* under or around gear(s) 40 that have various widths or diameters. Pivot member 26 is attached to crosspiece 22 in such a way as to allow pivot member 26 to rotate around its attachment point on crosspiece 22. A pair of pivot members 26 is linked through one slot 24*b* on each arm so as to allow claw arms 24 to be displaced away from and toward shaft 12. Also seen in FIG. 1 is machine wall 50 and hub or shaft 42 from which gear 40 is removed.

In the embodiment shown in FIG. 1, vibration means 30 ("vibrator 30") is operatively attached to shaft 12 between claw 20 and tightening means 14 which is located at one end of shaft 12. By operatively attached is meant that a component or device, in this case vibrator 30 is connected either directly or indirectly to a second component, in this case shaft 12, and causes that second component to operate or act in a certain manner. In this case, shaft 12 is made to vibrate and transmit vibrations to gear 40 and/or shaft 42 by vibrator 30. In the embodiment shown, vibrator 30 is located on unthreaded portion 12*b* of shaft 12. Nut 34 is used to butt vibrator 30 against the lower threaded portion of shaft 12. Nut 34 may be used to butt vibrator 30 against other regions of shaft 12. In one embodiment, vibrator 30 may be butted against vibrator receiver 36 on shaft 12 designed to nest with vibrator 30 to achieve close contact to more effectively transmit vibrations. Cord 32 is seen extending from vibrator 30 to a conventional power source (not shown). Examples of suitable vibrators 30 include, but are not limited to, Models CE-60, Scr-60 and DC-60 from VIBCO, Wyoming, R.I. and MOTOMAGNETIC® CDX explosion proof electric vibrators from Martin Engineering, Neponset, Ill. Persons having skill in the art will be able to select a suitable vibrator 30 based on the amplitude of vibration required, location, working environment, and other operational conditions.

Figure 2:
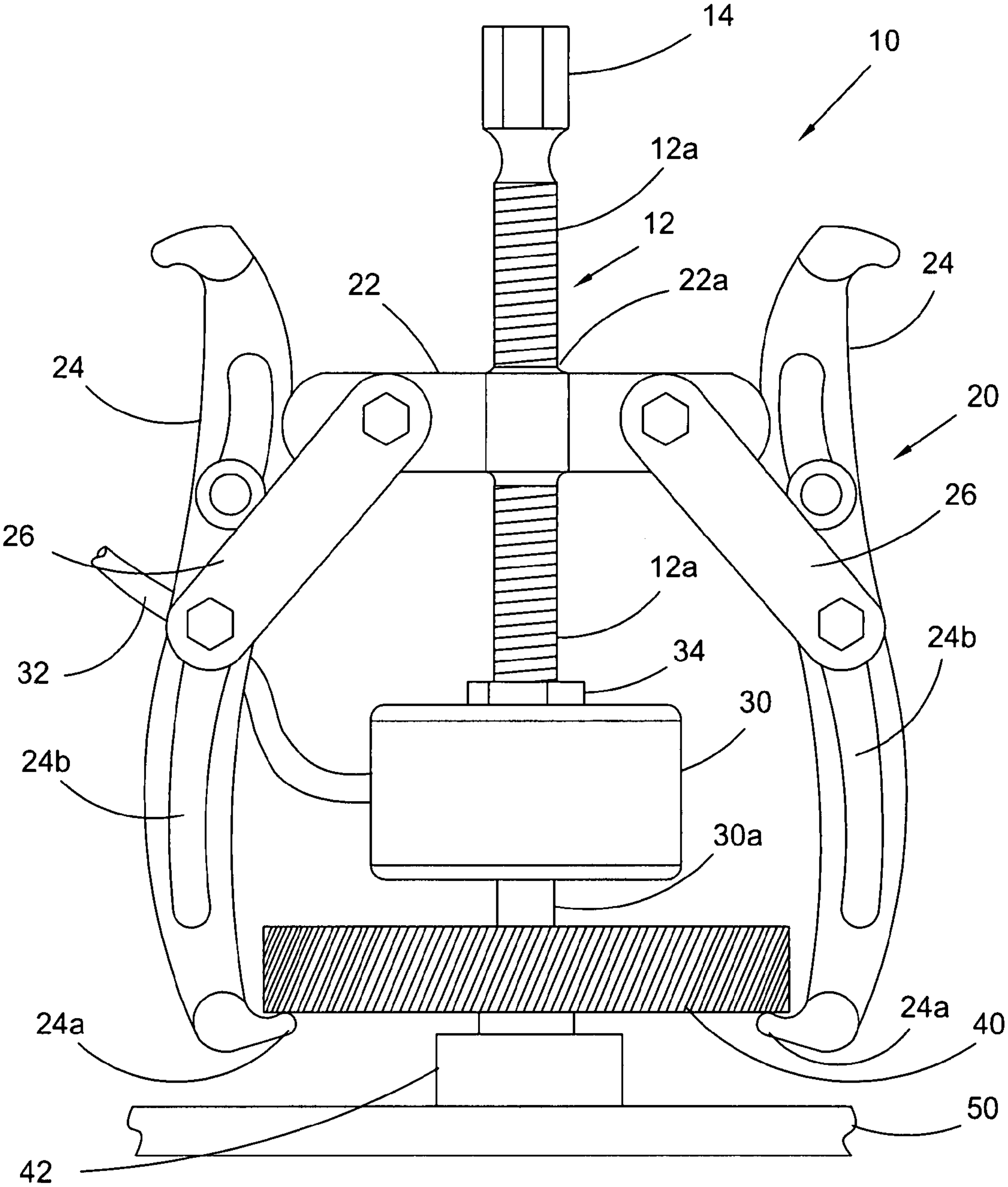
FIG. 2 is a side view of a second embodiment of the present invention in which the vibrating means is positioned on one end of the shaft opposite the tightening means.

FIG. 2 is a side view of a second embodiment of the present invention in which vibrating means 30 is positioned on one end of shaft 12 opposite tightening means 14. In this embodiment, the opposing end 12*c* (not seen) and vibrator 30 are configured to fit together to allow shaft 12 of system 10 to be tightened against gear 40 through vibrator 30. Claw 20 is positioned between tightening means 14 and vibrator 30. In one configuration of this second embodiment, vibrator 30 and opposing end 12*c* fit together in a male-female type fitting. Vibrator 30 spins freely on unthreaded portion 12*b* and is tightened against gear 40 by nut 34. Vibrator extension 30*a* extends from vibrator 30 to gear 40. Vibrator extension 30*a* may be a component of vibrator 30 or a separate element shaped to be positioned between gear 40 and vibrator 30. The embodiment shown in FIG. 2 may be seen as conferring the advantage of allowing system 10 to be fit into confined spaces in that shaft 12 is not required to extend a space sufficient to accommodate vibrator 30 between claw 20 and tightening means 14 and still allow an adequate length of shaft 12 to be tightened against gear 40.

Figure 3:
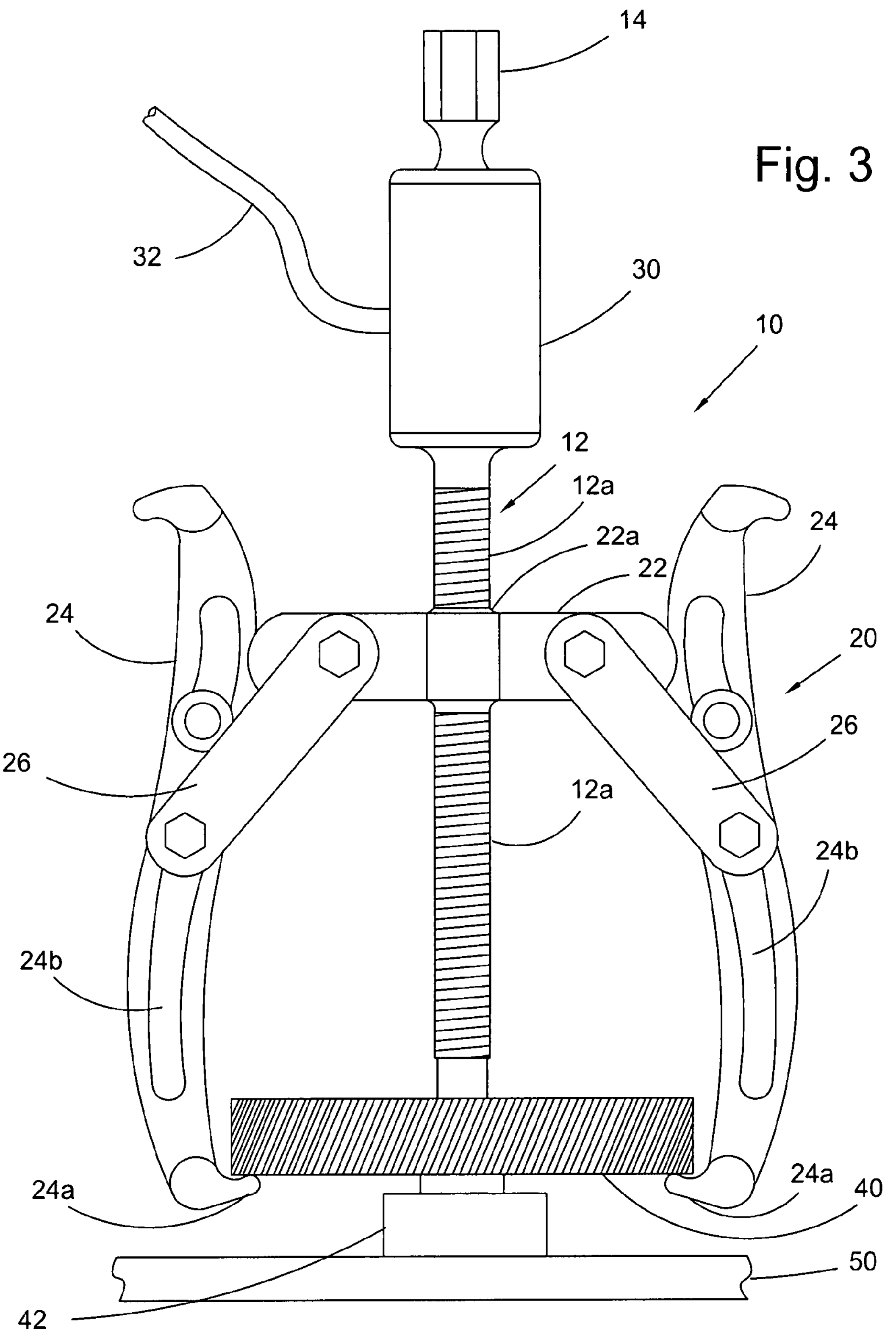
FIG. 3 is a side view of a third embodiment of the present invention in which the vibrating means is embedded within or incorporated with the shaft of the gear puller system to form an embedded or integral unit.

FIG. 3 is a side view of a third embodiment of system 10 in which vibrating means 30 is embedded within or incorporated with shaft 12 to form one integral unit. Vibrator 30 is seen just below tightening means 14 as part of or forming one end of shaft 12. The vibrations produced by vibrator 30 are transmitted along the length of shaft 12 to assist in loosening gear 40, thus helping to remove gear 40 from hub 42.

Figure 4:
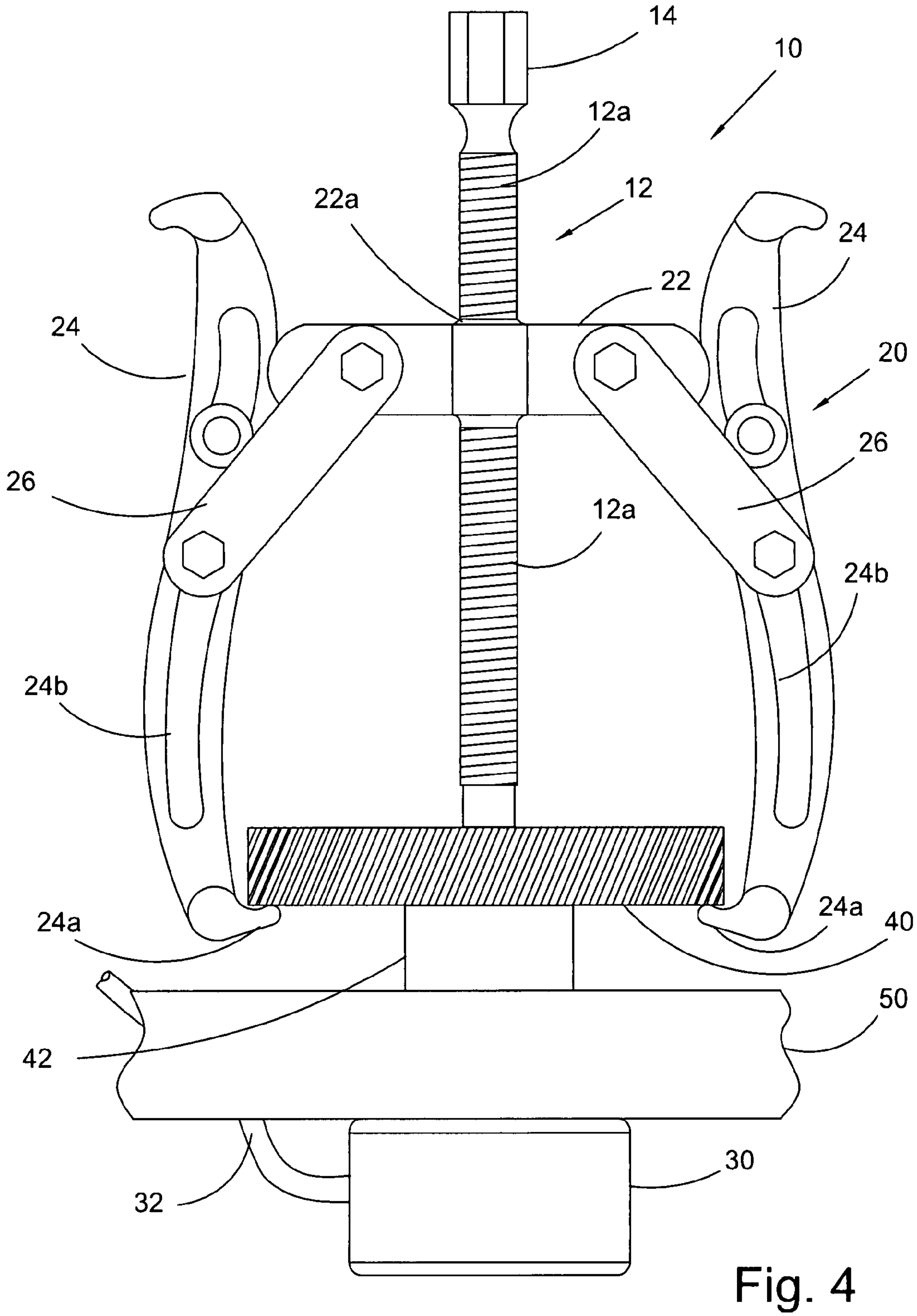
FIG. 4 is a side view of an additional embodiment of the system of the present invention in which the vibrating means is detached from the shaft of the gear puller and is positioned on the opposite side of a machine wall from the target gear.

FIG. 4 is a side view of an additional embodiment of system 10 in which vibrator 30 is detached from shaft 12. In the embodiment shown, vibrator 30 is in contact with a machine wall opposite the hub 42 or gear housing for gear 40. The vibrations from vibrator 30 are carried through the wall of machine 50 to gear 40. The vibrations aid system 10 in removing gear 40 from hub 42 or the gear housing. Vibrator 30 may be attached to machine 50 magnetically, by using a nut and bolt assembly (ies) suitable welding or brazing processes, or with suitable adhesives. Again, because in this embodiment no space needs to be provided on shaft 12 for vibrator 30, shaft 12 may be shortened to accommodate situations with smaller clearance space.

Figure 5:
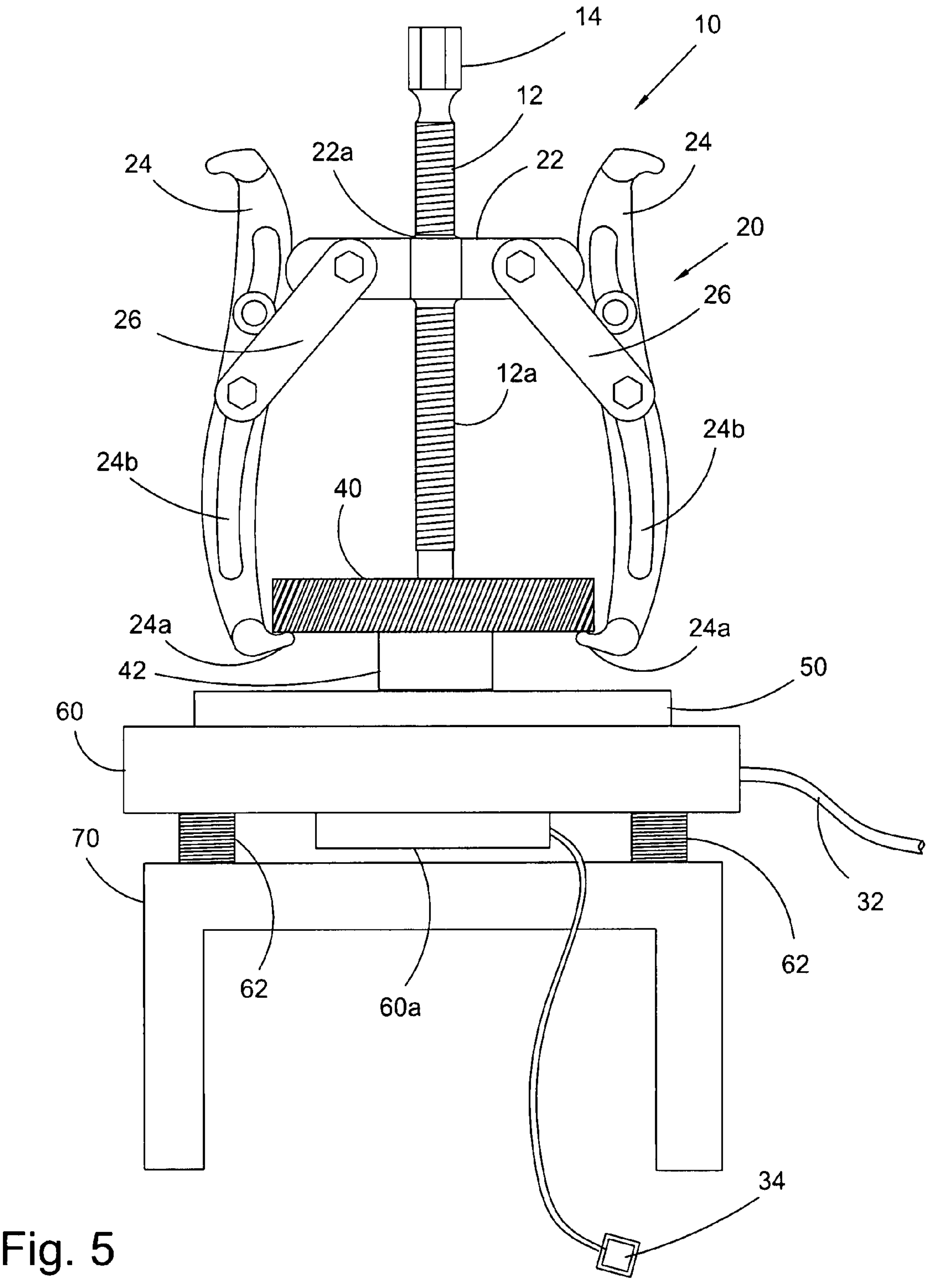
FIG. 5 is a side view of still another embodiment of the present invention in which the machine holding the target gear rests on vibrating pad.

FIG. 5 is a front view of an additional embodiment of system 10 in which vibrator 30 of system 10 is replaced by vibrating pad 60. As seen in FIG. 5, machine 50 is placed on vibration pad 60. Similar to the embodiment seen in FIG. 4, vibrations originate in vibration pad 60 and pass through the wall of machine 50 and hub 42 to gear 40. In a preferred embodiment, vibration pad 60 is magnetic which aids in retaining machine 50 on pad 60 when it is vibrating. In an alternate embodiment, vibrator 60*a* will create vibrations which will pass through vibrating pad 60 to machine 50 or add to vibrations created in vibration pad 60. Isolators 62 isolate pad 60 from support table 70 to prevent pad 60 from passing vibrations to table 70. Control 34 controls the vibration output of vibrator motor 30 or may be directly connected to vibration pad 60. Persons of skill in the art will recognize that pad 60 may include its own supports or it may be integrated with a support table 70 rather than resting a separate table or other support device. A suitable pad is Model 005 Vibratory Table from Best Bulk Equipment, Inc., Brunswick, Ohio 44212.

Figure 6:
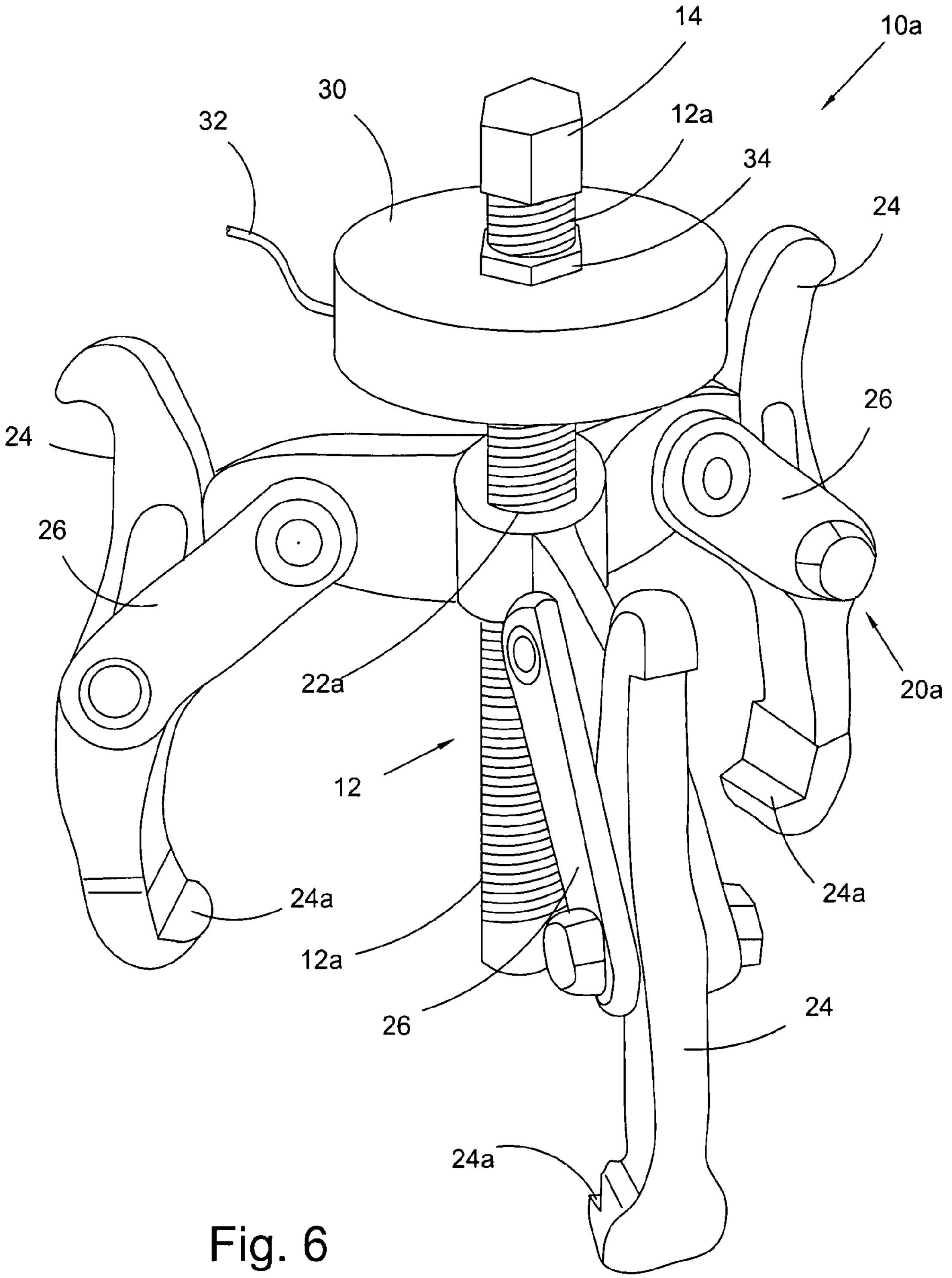
FIG. 6 is a side perspective view of a second alternate embodiment of the present invention in which the claw of the gear puller possesses three claw legs.

FIG. 6 is a side perspective view of alternate system 10*a* in which claw 20*a* includes three claw legs 24. It will be recognized by person of skill in the art that while the additional third claw provides additional stability, a gear puller system

10*a* that utilizes claw 20*a* will operate in a manner similar to system 10 discussed above utilizing claw 20. Thus, as discussed above, vibrator 30 in system 10*a* may be positioned in different locations on shaft 12 or machine 50 as described above for system 10.

Figure 7:
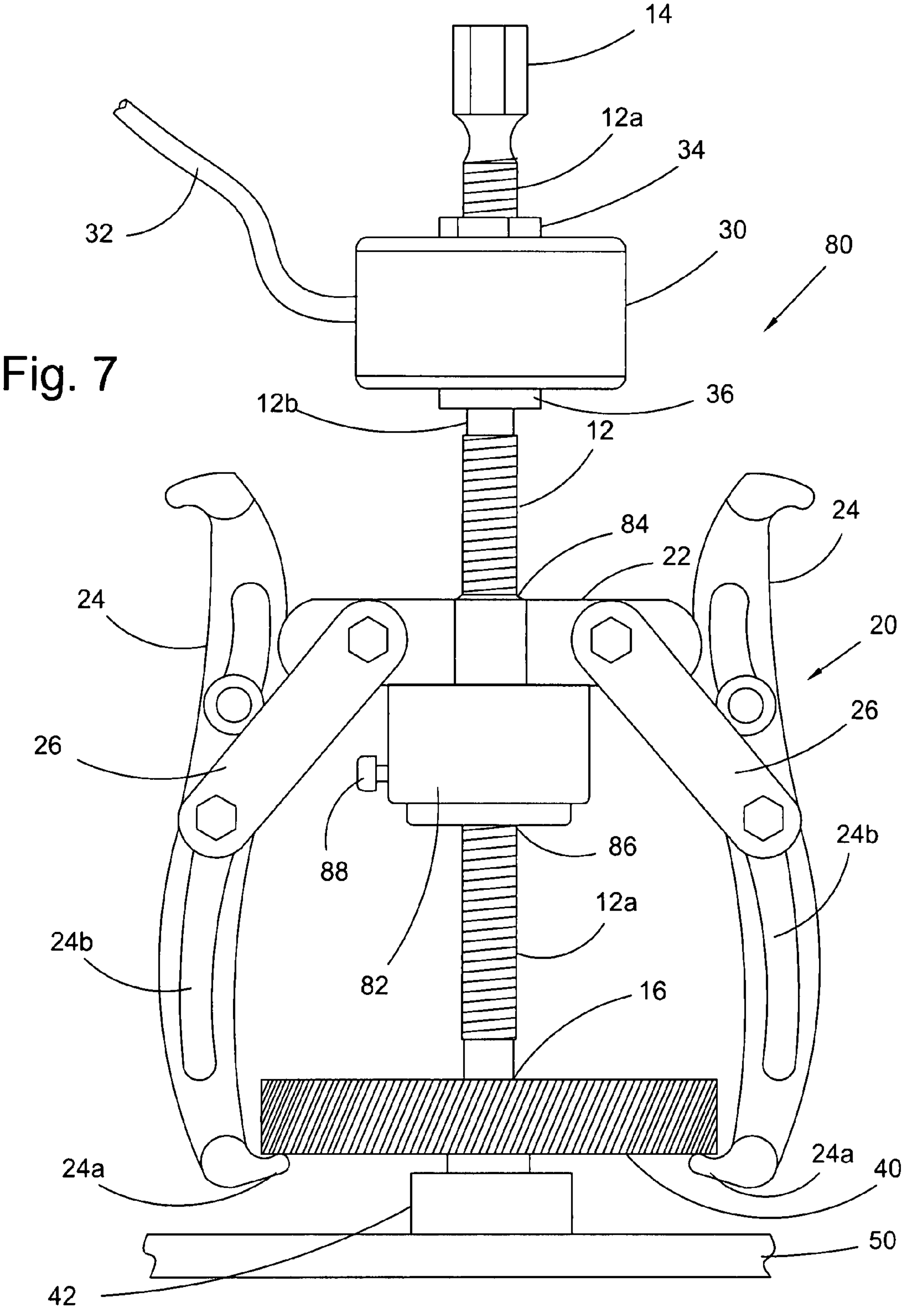
FIG. 7 is a side view of yet another embodiment of the present invention gear puller system including a hydraulic press; and, FIG. 8 is a side view of still yet another embodiment of the present invention gear puller system including a hydraulic press.

FIG. 7 is a side view of yet another embodiment of the present invention, i.e., gear puller system 80, including fluid driven system 82. Gear puller system 80 includes shaft 12 having threads 12*a* along all or most of its length. Tightening means 14 is positioned at one end of shaft 12. In this embodiment, tightening means 14 is a hexagonal nut shaped into one end of shaft 12. In other embodiments, tightening means 14 may be in the form of a welded nut, a turning rod or handle inserted through a hole at the end of shaft 12, or other embodiments well known to those skilled in the art.

Claw 20 includes crosspiece 22 disposed along and about shaft 12. Crosspiece 22 defines orifice 84; however, unlike previous embodiments having orifice 22*a*, orifice 84 does not include internal threads that allow crosspiece 22 to be threadably attached to shaft 12. In this embodiment, fluid driven system 82 includes orifice 86 having internal threads (not shown) that allow fluid driven system 82 to be threadably attached to shaft 12. At least two claw legs 24 are pivotably attached to crosspiece 22. By pivotably attached is meant that claw legs 24 are attached to crosspiece 22 in such a manner that are able to be displaced away from shaft 12 and then reposition to fit claw points 24*a* under or around gear(s) 40 that have various widths or diameters. Pivot member 26 is attached to crosspiece 22 in such a way as to allow pivot member 26 to rotate around its attachment point on crosspiece 22. A pair of pivot members 26 is linked through one slot 24*b* on each arm so as to allow claw arms 24 to be displaced away from and toward shaft 12. Also seen in FIG. 7 is machine wall 50 and hub or shaft 42 from which gear 40 is removed.

In the embodiment shown in FIG. 7, vibrator 30 is operatively attached to shaft 12 between claw 20 and tightening means 14 which is located at one end of shaft 12. Again, operatively attached means that a component or device, in this case vibrator 30 is connected either directly or indirectly to a second component, in this case shaft 12, and causes that second component to operate or act in a certain manner. In this case, shaft 12 is made to vibrate and transmit vibrations to gear 40 and/or shaft 42 by vibrator 30. In the embodiment shown, vibrator 30 is located on unthreaded portion 12*b* of shaft 12. Nut 34 is used to butt vibrator 30 against the lower threaded portion of shaft 12. Nut 34 may be used to butt vibrator 30 against other regions of shaft 12. In one embodiment, vibrator 30 may be butted against vibrator receiver 36 on shaft 12 designed to nest with vibrator 30 to achieve close contact to more effectively transmit vibrations. Cord 32 is seen extending from vibrator 30 to a conventional power source (not shown). Again, examples of suitable vibrators 30 include, but are not limited to, Models CE-60, Scr-60 and DC-60 from VIBCO, Wyoming, R.I. and MOTOMAGNETIC® CDX explosion proof electric vibrators from Martin Engineering, Neponset, Ill. Persons having skill in the art will be able to select a suitable vibrator 30 based on the amplitude of vibration required, location, working environment, and other operational conditions.

In this embodiment, after tightening means 14 is used to abut shaft 12 against shaft 42, thereby engaging claws 20 with gear 40, a fluid which drives fluid driven system 82 is introduced therein via coupling 88. The introduction of fluid within fluid driven system 82 drives shaft 12 in an axial direction, i.e., in a direction toward shaft 42, thereby applying additional, or in other words greater, pressure than is applied by use of tightening means 14. Depending on the type of application for which gear puller system 80 is used, e.g., high or low pressure applications, the fluid introduced into system 82 may be a liquid or a gas. In applications where a high removal pressure is required, the fluid is a liquid, e.g., a hydraulic fluid, and contrarily in applications where low removal pressure is required, the fluid is a gas, e.g., compressed air. Examples of gear puller systems which include a fluid driven system as arranged in this embodiment are well known in the art, e.g., Models PH172, PH303 and PH503 from SPX Power Team, Rockford, Ill.; however none of these systems include vibration means as described in the present invention gear puller systems.

Figure 8:
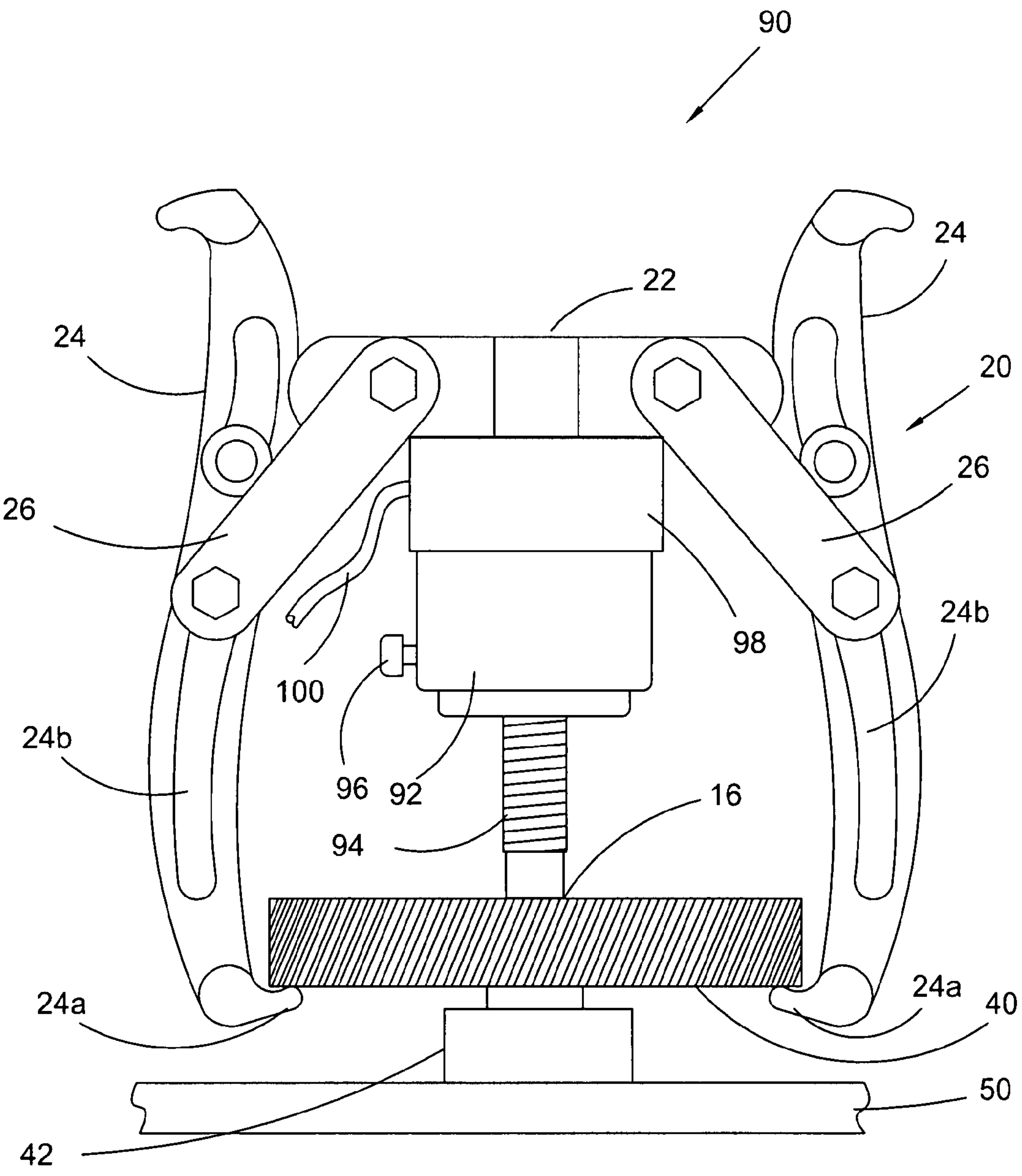

FIG. 8 is a side view of still yet another embodiment of the present invention, i.e., gear puller system 90, including fluid driven system 92. In this embodiment, shaft 94 is not manually tightened by a user of system 90, but is displaced axially only by fluid driven system 92. Thus, a user of system 90 positions claws 20 about gear 40, as described above, and then a fluid which drives fluid driven system 92 is introduced therein via coupling 96. Upon fluid introduction, fluid driven system 92 drives shaft 94 in an axial direction, i.e., a direction toward shaft 42. Then, as described above, vibration means 98 ("vibrator 98") is powered via cord 100 thereby introducing vibration modes into gear 40 and/or shaft 42, for assisting in the removal of the gear 40 from shaft 42. Although in a preferred embodiment vibrator 98 is positioned between crosspiece 22 and fluid driven system 92, it should be appreciated that vibrator 98 can also be positioned on crosspiece 22 on the side opposite fluid driven system 92 or fluid driven system 92 can also be positioned between crosspiece 22 and vibrator 98, and such variations are within the spirit and scope of the claimed invention.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A gear pulling system comprising:

a gear puller including;

a shaft having a first end and a second end, wherein said shaft is threaded for most of its length between said first end and said second end and includes an unthreaded portion in between said first and second ends;

a first tightening means positioned at said first end;

a claw, said claw having a crosspiece, said crosspiece defining an orifice having an internal thread, wherein said orifice is threadably engaged with said threaded shaft;

at least two claw legs pivotally attached to said crosspiece; and, a vibration means, said vibration means operatively attached to said shaft to generate vibrations through said shaft by means of an electrical connection and a frequency mechanism wherein said vibration means is directly connected to said shaft at said unthreaded portion.

2. The gear puller system as recited in claim 1 further comprising a fluid driven system operatively arranged to drive said shaft in an axial direction.

3. The gear puller system as recited in claim 2 wherein said fluid driven system is driven by a fluid, said fluid is a gas or a liquid.

4. The gear puller system as recited in claim 1 wherein said at least two claw legs comprises at least three claw legs.

5. The gear puller system as recited in claim 1 wherein said vibration means is operatively attached to said shaft between said first end and said claw.

6. The gear puller system as recited in claim 1 wherein said vibration means is embedded within said shaft.

7. The gear puller system as recited in claim 1 wherein said claw is proximal to said first end and said vibration means is distal to said first end.

8. The gear puller system as recited in claim 7 further comprising a tightening nut proximal to said first end, wherein said tightening nut butts said vibration means to said shaft.

9. The gear puller system as recited in claim 8 wherein said shaft further comprises a vibration receiver adjacent to said unthreaded portion wherein said vibration means is at least operatively attached to said unthreaded portion and said tightening nut holds said vibration means to said vibration receiver.

10. The gear puller system as recited in claim 1 wherein said tightening means is a nut fixedly attached to said first end.

11. The gear puller system as recited in claim 1 wherein said first end is formed into a hexagonal shape to form said tightening means.

12. A gear pulling system comprising:

a gear puller including;

a shaft including an unthreaded portion in between a first and second ends;

a claw, said claw having a crosspiece;

at least two claw legs pivotally attached to said crosspiece;

a fluid driven system integral with said crosspiece and operatively arranged to drive said shaft in an axial direction; and, a vibration means, said vibration means operatively attached to said shaft to generate vibrations through said shaft by means of an electrical connection and a frequency mechanism wherein said vibration means is directly connected to said shaft at said unthreaded portion.

13. The gear puller system as recited in claim 12 wherein said fluid driven system is driven by a fluid, said fluid is a gas or a liquid.

* * * * *